US006764726B1

(12) United States Patent
Yang et al.

(10) Patent No.: US 6,764,726 B1
(45) Date of Patent: Jul. 20, 2004

(54) INK JET RECORDING SHEET WITH IMPROVED IMAGE WATERFASTNESS

(76) Inventors: Sen Yang, 32 Terrace Ave., Nanuet, NY (US) 10954; William K. Istone, 159 Toleman Rd., Washingtonville, NY (US) 10992; David V. Celli, 260 Highland Ave., Pearl River, NY (US) 10965

( * ) Notice: Subject to any disclaimer, the term of this patent is extended or adjusted under 35 U.S.C. 154(b) by 0 days.

(21) Appl. No.: 09/567,920

(22) Filed: May 10, 2000

Related U.S. Application Data

(63) Continuation-in-part of application No. 09/310,654, filed on May 12, 1999, now abandoned.

(51) Int. Cl.[7] .................................................. B32B 5/00

(52) U.S. Cl. ................................. 428/32.18; 428/32.32

(58) Field of Search ........................... 428/32.18, 32.32, 428/32.16, 195

(56) References Cited

U.S. PATENT DOCUMENTS

| | | | | |
|---|---|---|---|---|
| 4,980,025 A | | 12/1990 | Andersson et al. | 162/168.3 |
| 6,051,107 A | * | 4/2000 | Varnell | 162/135 |
| 6,242,082 B1 | * | 6/2001 | Mukoyoshi et al. | 428/212 |

FOREIGN PATENT DOCUMENTS

| | | |
|---|---|---|
| EP | 0 673 779 | 9/1995 |
| EP | 0 745 488 | 12/1996 |
| EP | 0 818 322 | 1/1998 |

* cited by examiner

*Primary Examiner*—B. Hamilton Hess

(57) ABSTRACT

This invention is directed to an ink jet recording sheet having improved image waterfastness for use in ink jet printing comprising a substrate having in contact with at least one surface thereof one or more nitrogen containing organic species, preferably admixed with one or more starches, to process of forming such recording sheet, to a method of generating one or more image(s) on said recording sheet in an ink jet printing process and to a recording sheet having one or more images on a surface thereof.

52 Claims, No Drawings

INK JET RECORDING SHEET WITH IMPROVED IMAGE WATERFASTNESS

This is a continuation-in-part of application Ser. No. 09/310,654, filed May 12, 1999, now abandoned.

BACKGROUND OF THE INVENTION

1. Field of the Invention

This invention relates to ink jet recording sheets. More particularly, this invention relates to ink jet recording sheets having improved image waterfastness, and in particular to a paper based recording sheet, which is suitable as a recording sheet for use in an ink jet recording process.

2. Prior Art

Ink jet recording systems using aqueous inks are now well known. These systems usually generate almost no noise and can easily perform multicolour recordings for business, home and commercial printing applications. Recording sheets for ink jet recordings are known. See for example U.S. Pat. Nos. 5,270,103; 5,657,064; 5,760,809; 5,729,266; 4,792,487; 5,405,678; 4,636,409; 4,481,244; 4,496,629; 4,517,244; 5,190,805; 5,320,902; 4,425,405; 4,503,118; 5,163,973; 4,425,405; 5,013,603; 5,397,619; 4,478,910; 5,429,860; 5,457,486; 5,537,137; 5,314,747; 5,474,843; 4,908,240; 5,320,902; 4,740,420; 4,576,867; 4,446,174; 4,830,911; 4,554,181; and 4,877,680.

SUMMARY OF THE INVENTION

One aspect of this invention is directed to a recording sheet for use in ink jet printing comprising a substrate having in contact with at least one surface thereof one or more nitrogen containing species. In the preferred embodiments of the invention, the one or more nitrogen containing compounds are in a mixture which also comprises one or more starches, one or more polymer emulsion additives or a combination thereof.

The ink jet recording sheets of this invention exhibit one or more advantages over conventional ink jet printing recording sheets. For example, the ink jet recording sheets of this invention exhibit one or more improved image waterfastness properties. These improve properties include enhanced imagery water resistance to bleed and wet-rub and reduced density loss after exposure to high humidity or in contact with water.

Still another aspect of this invention relates to a process of forming the ink jet recording sheet of this invention which comprises:

(a) applying a liquid composition comprising a volatile liquid such as water, methanol or the like having dissolved or dispersed therein one or more nitrogen containing organic species, preferably a mixture of such species and one or more starches, one or more polymeric emulsion additives or a combination thereof, to a surface of said sheet to form a wetted, treated sheet having said species or said mixture in contact with said surface; and (b) drying said surface of said wetted, treated sheet to form said ink jet recording sheet.

Yet another aspect of this invention relates to a method of generating images on a surface of an ink recording sheet in an ink jet printing apparatus which comprises:

(a) incorporating the ink jet recording sheet of this invention into said apparatus; and (b) forming an image on a surface of said sheet treated with said species or said mixture by causing ink to be expelled from said apparatus onto said treated surface of the ink jet recording sheet and to the imaged sheet resulting from such method.

DETAILED DESCRIPTION OF THE INVENTION

One essential component of the ink jet recording sheet of this invention is a substrate. Any suitable substrate can be employed. For example, the substrate can be a transparent film, an opaque film, a synthetic paper or a paper.

Transparent films can be any of the conventional transparent resin films, generally thermoplastic films. Illustrative of such useful transparent films are polyester films, (e.g., polyethylene terephthalate and poly (butylene terephthalate)), polystyrene films, polyvinyl chloride films, polymethylmethacrylate films, polyamide films, polycarbonate films, and the like.

Any conventional opaque film can be used. For example, such opaque films can be a white or colored film. The opaque or colored films generally contain pigments or fillers such as barium sulfate, titanium dioxide, talc, air bubbles or microbubbles dispersed in a polymeric matrix (usually a thermoplastic resin) in order to give the opaque appearance. Illustrative of such white or colored opaque films are white polyester films which are commercially available, e.g., under the trademark "Melinex" from ICI Films. Besides the white polyester film, other opaque films which can be used include vinyl films, preferably adhesive backed, which are available under the trademarks "ScotchCal" from 3M and "RexCal" from Rexham, Inc. Commercially available biaxially oriented polypropylene films, which are opaque, may also be used.

The substrate can be a synthetic paper as for example a synthetic paper made from polyolefin fibers. Such synthetic papers are commercially available as for example from DuPont under the trademark "Tyvex".

The substrate can also be a paper based substrate. Illustrative of useful paper based substrates are plain papers such as papers made from hardwood fibres, softwood fibres, blends of hardwood and softwood fibres or other non-wood fibres, photobase paper, which is a paper coated with polyethylene, and the like.

In the preferred embodiments of the invention, the substrate is paper. In the more preferred embodiments of this invention, the substrate is plain paper.

The substrate can be of any basis weight. Preferably, the substrate basis weight is from about 20 to about 500 $g/m^2$, although substrate basis weight can be outside of this range if desired. The basis weight is more preferably from about 20 to about 300 $g/m^2$ and most preferably from about 50 to about 200 $g/m^2$. In the embodiments of choice, the basis weight is from about 60 to about 120 $g/m^2$.

In the preferred embodiments of this invention, the substrate has one or more properties that enhance the image waterfastness of ink jet recording sheets formed from the substrate. There are three components which define the image waterfastness of an ink jet recording sheet. These are density loss, bleed and rub resistance.

If a solid color is printed on a sheet or paper and the printed section is immersed into water, some ink will dissolve into the water leaving the remaining image faded or less dark. The density (darkness) of the printed solid can be measured with an optical densitomer both before and after immersion into water. The difference between the density readings can be expressed as the density loss ("DL %").

If a solid color is printed on a sheet of paper and the printed section is immersed into water, some ink will dissolve from the printed solid and migrate onto the adjacent non-printed area. The density (darkness) of the adjacent non-printed area can be measured with an optical densitometer both before and after immersion into water. The difference between the density readings can be expressed as a percentage of the density of the printed solid. This percentage is the bleed.

If a solid color is printed on a sheet of paper and the printed area is rubbed with a wet object, such as a highlighter pen or a swab wetted with water, some ink will be smeared from the printed solid onto the adjacent non-printed area. The density (darkness) differences of the adjacent non-printed area and the non-imaged area (background of paper) can be expressed as wet-rub.

If the substrate is tight, highly sized and non-porous, the nitrogen containing organic specie(s) coating and the ink jet ink will be dried on the top surface. While the complex between the nitrogen containing organic specie(s) and the ink is sufficiently strong to prevent the ink from redissolving into water (hence good density loss and bleed), the fact that this complex sits upon the surface allows the complex to be rubbed off by mechanical action. If the substrate is open, slack sized by treatment with one or more starches and porous, the one or more nitrogen containing organic specie (s) on the surface of the sheet and the ink jet ink will soak into the surface layer of fibers before drying and the complex will form in this surface fiber layer. The complex formation will yield good image density and less bleed; the anchoring of this complex in the fiber layer of the substrate will yield a resistance to mechanical abrasion giving good wet rub as well. There is a trade off, however; the ink can soak too far into the paper before drying, the observed print quality will decline. So the substrate preferably has sizing and porosity levels within a range such so that when the one or more nitrogen containing compounds is/are applied and then the sheet is ink jet printed, the ink-nitrogen containing organic specie(s) complex will form in the surface layer of fibers in order to yield good waterfastness properties (density loss, bleed and wet rub) and also yield good print quality (print density, dot gain and dot circularity).

The Gurley porosity of the base substrate is selected to provide the desired waterfastness characteristics. The Gurley porosity is measured by the procedure of TAPPI T460 om-88. In the preferred embodiments of this invention, the substrate has a Gurley porosity preferably from about 5 sec/100 ml to about 75 sec/100 ml. The Gurley porosity is more preferably from about 5 sec/100 ml to about 70 sec/100 ml and most preferably from about 5 sec/100 ml to about 50 sec/100 ml. In the embodiments of choice, the Gurley porosity is from about 10 sec/100 ml to about 35 sec/100 ml.

The pore diameter of the substrate is selected to provide the desired waterfastness characteristics. The pore diameter is measured by mercury intrusion porosimetry. In the preferred embodiments of this invention, the substrate has a pore diameter is preferably from about 2.0 to about 3.5. The pore diameter is more preferably from about 2.2 to about 3.3 and most preferably from about 2.4 to about 3.1. In the embodiments of choice, the pore diameter is from about 2.6 to about 3.0.

The Hercules Sizing Test Value ("HST") of the substrate is selected to provide the desired waterfastness characteristics. The HST is measured using the procedure of TAPPI 530 pm-89. In the preferred embodiments of this invention, the HST is preferably from about 1 second to about 400 seconds. The HST is more preferably from about 3 seconds to about 300 seconds and most preferably from about 5 seconds to about 200 seconds. In the embodiments of choice, the HST is from about 10 seconds to about 100 seconds. As it is well known to those of ordinary skill in the art, the HST will vary directly with the basic weight of the substrate and other factors known to those of ordinary skill in the art. Based upon the foregoing information, one of ordinary skill in the art can use conventional techniques and procedures to calculate, determine and/or estimate a particular HST for the substrate used to provide the desired image waterfastness characteristics.

In contact with at least one surface of the substrate is an "effective amount" of one or more nitrogen containing organic species. As used herein, an "effective amount" is an amount which is sufficient to enhance the waterfasteness of the substrate to any extent. This amount of can vary widely, provided that the desired result is achieved. Usually, this amount is at least about 1 $g/m^2$ although lower amounts can be used. The amount or one or more nitrogen containing organic species is preferably from about 0.5 $g/m^2$ to about 3 $g/m^2$ and most preferably from about 1 $g/m^2$ to about 2 $g/m^2$.

Suitable nitrogen containing organic species are compounds, oligomers and polymers are those containing one or more quaternary ammonium functional groups. Such functional groups may vary widely and include substituted and unsubstituted amines, imines, amides, urethanes, quaternary ammonium groups, dicyandiamides and the like. Illustrative of such materials are polyamines, polyethyleneimines, copolymers of diallyldimethyl ammonium chloride (DADMAC), copolymers of vinyl pyrrolidone (VP) with quaternized diethylaminoethylmethacrylate (DEAMEMA), polyamides, cationic polyurethane latex, cationic polyvinyl alcohol, polyalkylamines dicyandiamid copolymers, amine glycigyl addition polymers, poly [oxyethylene (dimethyliminio) ethylene (dimethyliminio) ethylene] dichlorides.

Preferred nitrogen containing organic species for use in the practice of this invention are low to medium molecular weight cationic polymers and oligomers having a molecular equal to or less than 100,000, preferably equal to or less than about 50,000 and more preferably from about 10,000 to about 50,000. Illustrative of such materials are polyalkylamine dicyandiamide copolymers, poly[oxyethylene (dimethyliminio ethylene(dimethyliminioethylene] dichlorides and polyamines having molecular weights within the desired range. More preferred nitrogen containing organic species for use in the practice of this invention are low molecular weight cationic polymers such as polyalkylamine dicyandiamid copolymer, poly[oxyethylene (dimethyliminio)ethylene(dimethyliminio)ethylene] dichloride. Most preferred nitrogen containing organic species for use in the practice of this invention are low molecular weight polyalkylamine dicyandiamid copolymers.

In the preferred embodiments of this invention, a mixture comprising one or more compounds, oligomers, polymers or a combination thereof having one or more cationic nitrogen functional groups and an effective amount of one or more starches is in contact with at least one surface of the substrate. Illustrative of useful starches for the practice of this preferred embodiment of the invention are naturally occurring carbohydrates synthesized in corn, tapioca, potato and other plants by polymerization of dextrose units. All such starches and modified forms thereof such as starch acetates, starch esters, starch ethers, starch phosphates, starch xanthates, anionic starches, cationic starches and the like which can be derived by reacting the starch with a suitable chemical or enzymatic reagent can be used in the practice of this invention.

Useful starches may be prepared by known techniques or obtained from commercial sources. For example, the suitable starches include PG-280 from Penford Products, SLS-280 from St. Lawrence Starch, the cationic starch CatoSize 270 from National Starch and the hydroxypropyl No. 02382 from Poly Sciences, Inc.

Preferred starches for use in the practice of this invention are modified starches. More preferred starches are cationic modified or non-ionic starches such as CatoSize 270 and KoFilm 280 (all from National Starch) and chemically modified starches such as PG-280 ethylated starches and AP Pearl starches. More preferred starches for use in the practice of this invention are cationic starches and chemically modified starches. While it is believed that cationic starches provide for better improvements to image waterfastness, chemically modified starches also provide good results and are more economical.

When the preferred low molecular weight polyalkylamine dicyandiamid copolymer nitrogen containing organic species and the preferred PG-280 starch are used, the desired bleed, density loss and wet-rub characteristics of the sheet are obtained when the weight ratio of the nitrogen organic containing organic species to the starch is equal to or greater than about 10% to 200%. In these embodiments, the weight ratio of the nitrogen containing organic species to the starch is preferably from about 10% to about 100%, more preferably from about 20% to about 80%, and most preferably from about 30% to about 50%.

The amount of the mixture of one or more nitrogen containing organic species and one or more starches on the surface of a substrate may vary widely and any conventional amount can be used. In general, the amount employed is at least about 0.5 $g/m^2$ of recording sheet. The amount is preferably at least about 1.0 $g/m^2$, more preferably at least about 1.5 $g/m^2$ and most preferably from about 1.5 $g/m^2$ to about 3.0 $g/m^2$.

The mixture may include other ingredients in addition to the starch used in the preferred embodiments of the invention, except for a pigment typically applied to the surface of a recording sheet in conventional amounts. Such optional components include dispersants, fluorescent dyes, surfactants, deforming agents, preservatives, binders, pH control agents, coating releasing agents, and the like.

The ink jet recording sheet of this invention can be prepared using known conventional techniques. For example, the essential one or more nitrogen containing organic species preferably admixed with one or more starches, and one or more optional components can be dissolved or dispersed in an appropriate liquid medium, preferably water, and can be applied to the substrate by any suitable technique, such cast coating, dip coating, Meyer rod coating, reverse roll coating, extrusion coating or the like using conventional coating tools such as a coater, air knife coater, curtain coater, bar coater or gravure coater. Thereafter the wet coated substrate is dried through use of conventional drying apparatuses and processes. Such coating techniques are well known in the art and will not be described in any great detail.

The essential one or more nitrogen containing organic species and one or more starches and optional components can be dissolved or dispersed in an appropriate liquid medium, preferably water, and can be applied to the substrate by any suitable technique, such a size press treatment, dip coating, reverse roll coating, extrusion coating or the like. For example, the coating can be applied with Symsizer (Valmet) type equipment, a KRK size press (Kumagai Riki Kogyo Co., Ltd., Nerima, Tokyo, Japan) by dip coating. The KRK size press is a lab size press that simulates a commercial size press. This size press is normally sheet fed, whereas a commercial size press typically employs a continuous web.

In dip treating, a web of the material to be treated is transported below the surface of the liquid coating composition by a single roll in such a manner that the exposed site is saturated, followed by removal of any excess treating mixture by the squeeze rolls an drying at 100° C. in an air dryer. The liquid treating composition generally comprises the desired treating composition dissolved in a solvent such as water, methanol, or the like. The method of surface treating the substrate using a coater results in a continuous sheet of substrate with the treating material applied first to one side and then to the second side of this substrate. The substrate can also be treated by a slot extrusion process, wherein a flat die is situated with the die lips in close proximity to the web of substrate to be treated, resulting in a continuous film of the treating solution evenly distributed across one surface of the sheet, followed by drying in an air dryer at 100° C.

The ink jet recording sheet of this invention exhibits waterfastness. Waterfastness is determined by at least one or more of three components. One component is "density loss", which is defined as the retention of optical density after direct exposure to water; it is expressed as a percentage of the optical density retained after immersion in water. The method involves printing solid colored stripes on paper, immersing one-half of the stripe into deionized water at 23° C. for 60 seconds, and then air drying the paper. The optical density is read on the immersed ($OD_W$) and non-immersed ($OD_O$) portions of the stripe by a reflectance densitometer (X-Rite, Macbeth. Etc.). The percent density loss ("DL %") is defined as DL %=[($OD_W$–$OD_O$/$OD_O$]×100. In this equation, a positive DL % indicates a density increase after water immersion. While we do not wish to be bound by any theory, it is believed that this density increase is done to ink dye redistribution which provides for a more uniform ink coverage. A negative DL % is believed to indicate that the ink dye is washed out after the sample is subjected to water immersion and is undesirable. Preferably, the DL % is from about −10% to about 10%. More preferably, the DL % is from about −5% to about 10%. Most preferably, the DL % is from about 0% to about 10%.

Another component of waterfastness is bleed. As used herein, bleed is defined as that ink which runs from a printed solid to an adjacent non-printed area as a result of contact with water. The test is similar to that for density loss measurement (see above). The black optical density is measured on the immediately adjacent non-image area to the portion of the color stripe immersed in water. This measured value is $OD_B$. The percent bleed is defined as % B=100×($OD_B$/$OD_O$). In general, the % B is equal to or less than about 10%. More preferably, the % B is equal to or less than about 5%. More preferably, the % B is equal to or less than about 2%. Most preferably, the % B is about 0%.

Still another component of waterfastness is wet-rub. As used herein, wet-rub is defined as that portion of ink which can be transferred from a printed solid to an adjacent non-image area by rubbing the paper in the presence of water. This test involves printing a solid color stripe on paper, placing one drop of deionized water onto the printed stripe, waiting 15 seconds, placing a 100 gram balance weight onto the wetted area, and moving the weight ten strokes (five in each direction) back and forth across the stripe. The optical density is measured on the background of the paper (non-imaged area) ($OD_O$) and on the rubbed area immediately adjacent to the solid color stripe ($OD_R$). The wet-rub ("WR") is defined as the density differences between the two measured optical densities or WR=$OD_R$–$OD_O$. In general, the WR is equal to or less than about 0.1optical density units (ODU). Preferably, the WR is equal to or less than about 0.06 ODU. More preferably, the WR is equal to or less than about 0.04 ODU. Most preferably, the WR is equal to or less than about 0.02 ODU.

In addition, to improved waterfastness, the ink jet recording sheet of this invention preferably exhibits good print quality. As used herein, print quality (PQ) is defined as the dot size and dot circularity of a series of half-tone printed dots as measured by an image analysis instrument. In general, the target dot circularity ("DC") is equal to or less than 1.30. Preferably, the DC is equal to or less than about 1.20. More preferably, the DC is equal to or less than about 1.10. Most preferably, the DC is equal to or less than about 1.0.

Recording sheets of the present invention can be employed in ink jet printing processes. One embodiment of the present invention is directed to a process which comprises applying an aqueous recording liquid to a recording sheet of the present invention in an image wise pattern. Another embodiment of the present invention is directed to a printing process which comprises (1) incorporating into an ink jet printing apparatus containing an aqueous ink a recording sheet of the present invention, and (2) causing droplets of the ink to be ejected in an image wise pattern onto the recording sheet, thereby generating images on the recording sheet. Ink jet printing processes are well known, and are described in, for example, U.S. Pat. Nos. 4,601,777, 4,251,824, 4,410,899, 4,412,224, and 4,532,530, the disclosures of each of which are totally incorporated herein by reference. In a particularly preferred embodiment, the printing apparatus employs a thermal ink jet process wherein the ink in the nozzles is selectively heated in an imagewise pattern, thereby causing droplets of the ink to be ejected in imagewise pattern.

The recording sheets of the present invention can also be used in any other printing or imaging process, such as printing with pen plotters, imaging with color laser printers or copiers, handwriting with ink pens, offset printing processes, or the like, provided that the toner or ink employed to form the image is compatible with the ink receiving layer of the recording sheet.

The present invention will be described with references to the following examples. The examples are intended to be illustrative and the invention is not limited to the materials, conditions, or process parameters set forth in the example. All parts and percentages are by unit weight unless otherwise indicated.

THE EXAMPLES

I. General Procedures for Preparing Coating Compositions and Coated Ink Jet Paper (A) Preparation of Coating Compositions A series of coating composition were prepared using the following procedure. The coating is prepared in the lab using a low shear mixer. A certain amount of water is added to the coating container, then the nitrogen containing species and then pre-cooked starch under proper shear actions. Then various coating additives such as optical brighteners, defoamers, and crosslinkers are added to the coating under shear when required. The desired coating solids for this application is in a range of 5 to 20% depending on the tolerance of the system to coating or size press treatment viscosity.

(B) Preparation of Coated Ink Jet Paper

1. Substrate Preparation

The substrate used in the present invention is made up with a fiber furnish consisting of 70% hardwood and 30% softwood fibers and 14% precipitated calium carbonate with alkenyl succinic anhydride internal size. The substrate is formed on a paper machine.

2. Size Press Treatment

The base paper used in this invention has a basis weight of about 75 g/m$^2$ and a HST value of about 25 seconds. The lab size press coater used for this example consists of two pressure nip rollers. To apply the coating formulation, one end of a 9"×12" sheet of paper substrate is sandwiched in between the two rollers and the coating formulation is poured into the nip reservoir, then the sheet is fed through the nip pond at a prefixed speed. By controlling the formulation solids and size press running speed, a pickup weight of 1.5 g/m$^2$ per side is achieved.

II. SPECIFIC EXAMPLES

A. Example 1

Using the procedure of paragraph I(A) above, a coating composition was prepared having the composition and components set forth in following Table 1.

TABLE 1

Coating Formulation

| Component | Chemical Description | Parts |
|---|---|---|
| PG-280[(a)] | Ethylated Starch | 7 |
| BuBond-60[(b)] | Poly[oxethylene(dimethyliminio)ethylene (dimethyliminio)ethylene] dichloride | 2.5 |
| Chromaset 700[(c)] | Styrene Acrylic Emulsion | 0.2 |
| Water | | 90.3 |

Total solid of the formulation of Table 1 is 9.7%. The components listed in the Table were obtained from commercial sources as follows:

(a) "PG-280" is manufactured and sold by Penford Products. Inc.;

(b) "BuBond-60" is manufactured and sold by Buckman Labs; and (c) "Chromaset 700" is manufactured and sold by Hercules.

Using the procedure of paragraph I(B) above, the formulation of Table 1 is coated on a paper substrate. The coat weight obtained for this example was 1.5 g/m$^2$.

B. Example 2

Using the procedure of Paragraph I(A) above, a coating formulation was prepared having the composition and components set forth in the following Table 2.

TABLE 2

Coating Formulation

| Component | Chemical Description | Parts |
|---|---|---|
| BuBond-60 | Poly[oxethylene(dimethyliminio)ethylene (dimethyliminio)ethylene] dichloride | 2.5 |
| Water | | 97.5 |

Total solid of the above formulation is 2.5%.

Using the procedure of paragraph I(B) above, the formulation of Table 2 is coated on a paper substrate. The coat weight obtained for this example was about 0.5 g/m$^2$.

C. Example 3

Using the procedure of paragraph I(A) above, a coating composition was prepared having the composition and components set forth in following Table 3.

TABLE 3

Coating Formulation

| Component | Chemical Description | Parts |
|---|---|---|
| PG-280 | Ethylated Starch | 7 |
| NiccaJet 117[(a)] | Polyalkylamine Dicyandiamine Condensate | 5 |
| Water | | 88 |

(a)"NiccaJet 117" is manufactured and sold by NICCA Chemical USA.

Total solid of the formulation of Table 3 is 13%.

Using the procedure of paragraph I(B) above, the formulation of Table 3 is coated on a paper substrate. The coat weight obtained for this example was 1.7 g/m$^2$.

D. Example 4

Using the procedure of paragraph I(A) above, a coating composition was prepared having the composition and components set forth in following Table 4.

TABLE 4

| Coating Formulation | | |
|---|---|---|
| Component | Chemical Description | Parts |
| PG-280 | Ethylated Starch | 7 |
| NiccaJet 117 | Polyalkylamine Dicyandiamine Condensate | 2.5 |
| Water | | 90.3 |

Total solid of the formulation of Table 4 is 9.5%.

Using the procedure of paragraph I(B) above, the formulation of Table 4 is coated on a paper substrate. The coat weight obtained for this example was 1.5 g/$m^2$.

E. Example 5

Using the procedure of paragraph I(A) above, a coating composition was prepared having the composition and components set forth in following Table 5.

TABLE 5

| Coating Formulation | | |
|---|---|---|
| Component | Chemical Description | Parts |
| PG-280 | Ethylated Starch | 7 |
| Cartafix TP[(a)] | Cationic Polyaminoether | 2.5 |
| Water | | 90.5 |

[(a)]"Cartafix TP" is manufactured and sole by sold by Clariant Corporation.

Total solid of the formulation of Table 5 is 9.5%.

Using the procedure of paragraph I(B) above, the formulation of Table 5 is coated on a paper substrate. The coat weight obtained for this example was 1.5 g/$m^2$.

F. Comparative Example 1

Using the procedure of paragraph I(A) above, a coating composition was prepared having the composition and components set forth in following Table 6.

TABLE 6

| Coating Formulation | | |
|---|---|---|
| Component | Chemical Description | Parts |
| PG-280 | Ethylated Starch | 7 |
| Water | | 93 |

Total solid of the formulation of Table 6 is 7%.

Using the procedure of paragraph I(B) above, the formulation of Table 6 is coated on a paper substrate. The coat weight obtained for this example was 1.4 g/$m^2$.

G. Comparative Example 2

The paper is a commercial Xerox uncoated copy paper, Product Code 4020.

H. Comparative Example 3

The paper is a commercial Hewlett Packard BrightWhite Uncoated Ink Jet Paper, Product Code C1824A.

I. Example 7

The density loss properties of the paper samples of Examples 1, 2, 3, 4 and 5 and Comparative Examples 1, 2 and 3 were evaluated. In this evaluation, paper samples were imaged with a Scitex test print head using Scitex 1036, Scitex 3600 and Collins 3600 RC monochrome black inks under TAPPI room condition (23° C. and 50% RH). On other samples, color patches of black, cyan, magenta, yellow were generated under TAPPI room conditions using a Canon BJC-4400 desktop ink jet printer. The densities of the samples were measured with an X-Rite 404 densitometer to indicate the density before water immersion $D_o$. Thereafter, the samples were immersed into deionized water at 23° C. for 60 seconds, and then air dried. The optical density of the samples were then measured after immersion to provide the density after immersion, $D_W$. The percent density loss resulting from immersion is then calculated using the following equation:

$$\text{Density Loss }\%=[(D_W-D_O)/D_O]\times 100.$$

The results are set forth in the following Tables 7 and 8. In Tables 7 and 8, a positive Density Loss (%) number indicates a density increase after water immersion. This is believed to be due to ink dye redistribution on the paper surface which provides a more uniform ink coverage. A negative Density Loss (%) number indicates ink dye is washed out after the sample is subjected to water immersion.

TABLE 7

| Waterfastness Results - High Speed Commercial Continuous Ink Jet Inks | | | |
|---|---|---|---|
| Sample ID | Scitex 1036 | Scitex 3600 | Collins 3600RC |
| Example 1 | 8.83 | 4.57 | 4.64 |
| Example 2 | 5.21 | 1.10 | 3.37 |
| Example 3 | 9.61 | 19.03 | 2.44 |
| Example 4 | 8.87 | 6.90 | 6.59 |
| Example 5 | 4.65 | 7.18 | 6.54 |
| Comparative Example 1 | −19.24 | −17.57 | −11.63 |
| Comparative Example 2 | −13.23 | −32.91 | −20.57 |
| Comparative Example 3 | −19.80 | −17.57 | −7.67 |

TABLE 8

| Density Loss - Desktop Ink Jet Printer Inks (Canon BJC-4400) | | | | |
|---|---|---|---|---|
| Sample ID | Black | Cyan | Magenta | Yellow |
| Example 1 | 2.80 | 1.89 | 1.29 | 7.62 |
| Example 2 | 7.42 | 2.17 | 1.92 | 5.26 |
| Example 3 | 9.24 | 1.62 | 0.66 | 3.52 |
| Example 4 | 5.18 | 1.86 | 1.93 | 4.76 |
| Example 5 | 7.01 | 3.69 | 2.88 | 7.14 |
| Comparative Example 1 | −12.99 | −27.52 | −18.83 | −9.23 |
| Comparative Example 2 | −19.13 | −21.54 | −20.07 | −12.12 |
| Comparative Example 3 | −15.41 | −27.44 | −20.34 | −2.92 |

J. Example 8

The wet-rub and bleed waterfastness properties of the papers of Examples 1, 2, 3, 4 and 5 and Comparative Examples 1, 2 and 3 were evaluated. In these evaluations, paper samples were imaged with 100% area fill of solid color blocks of black, cyan, magenta and yellow under TAPPI room conditions (23° C. and 50% RH) using a Canon BJC4400 desktop ink jet printer.

In the evaluation of bleed, the optical density of the samples on the area immediately adjacent to the imaged area were measured with an X-Rite 404 densitometer to indicate the density before water immersion $OD_o$ Thereafter, the samples were immersed into deionized water at 23° C. for 60 seconds and then air dried. The optical density of the area of the samples immediately adjacent to the imaged area was then measured after immersion to provide the density after immersion, $D_B$. The percent density loss resulting from immersion is then calculated using the following equation: The percent bleed ("% B") from the immersion is then calculated using the following equation:

$$\% B=(OD_B/OD_O)\times 100$$

The results are set forth in the following Table 9:

TABLE 9

Bleed Results - Desktop Ink Jet Printer Ink (Canon BJC-4400)

| Sample ID | Black | Cyan | Magenta | Yellow |
|---|---|---|---|---|
| Example 1 | 2.06 | 0.63 | 0.97 | 0.95 |
| Example 2 | 6.82 | 0.31 | 1.28 | 0.00 |
| Example 3 | 1.32 | 0.32 | 0.66 | 1.01 |
| Example 4 | 2.44 | 0.93 | 0.32 | 0.95 |
| Example 5 | 1.83 | 1.54 | 0.64 | 0.48 |
| Comparative Example 1 | 16.31 | 25.99 | 8.44 | 2.56 |
| Comparative Example 2 | 23.19 | 24.92 | 11.18 | 6.57 |
| Comparative Example 3 | 19.67 | 20.82 | 5.52 | 0.01 |

In the evaluation of wet-rub, three drops of deionized water were placed onto the imaged areas. After 15 seconds, a 100 gram balance weight was placed on the webbed area and was moved ten strokes (five in each direction) back and forth across the wetted area. The optical density is measured on a non-rubbed area of the imaged are ($OD_O$) and on the non-imaged area immediately adjacent to the rubbed area ($OD_R$). The percent wet-rub ("% WR") is calculated by the following equation:

$$WR=OD_R-OD_O$$

The results are set forth in the following Table 10.

TABLE 10

Wet-Rub Results - Desktop Ink Jet Printer (Cannon BJC-4400

| Sample ID | Black | Cyan | Magenta | Yellow |
|---|---|---|---|---|
| Example 1 | 0.04 | 0.04 | 0.04 | 0.02 |
| Example 2 | 0.04 | 0.07 | 0.05 | 0.02 |
| Example 3 | 0.04 | 0.05 | 0.04 | 0.04 |
| Example 4 | 0.02 | 0.05 | 0.03 | 0.03 |
| Example 5 | 0.03 | 0.05 | 0.03 | 0.03 |
| Comparative Example 1 | 0.10 | 0.16 | 0.10 | 0.06 |
| Comparative Example 2 | 0.11 | 0.12 | 0.12 | 0.06 |
| Comparative Example 3 | 0.11 | 0.14 | 0.10 | 0.05 |

K. Example 9

In order to determine the substrate properties needed to provide good waterfastness, a pilot study was done. In this study, the same nitrogen containing cationic polymer formulation was applied in the same manner to four substrates having different properties. The resultant pilot sheets were then test printed on an ink jet printer and tested for waterfastness. Multivariate linear regression analysis was used to determine which substrate properties exhibited strong correlations with improved waterfastness i.e. density loss, bleed and/or rub resistance.

In these studies, a formulation consisting of a low molecular weight polyalkylamine dicyandiamid copolymer and PG-280 ethylated starch was applied to each basestock with a pilot scale blade metering size press at a level of 2 percent by weight of formulation on paper. The properties of the substrates are shown in the following Table 11:

TABLE 11

| Basestock | Photosize | Gurley porosity | Density | Pore Diameter | Contact Angle |
|---|---|---|---|---|---|
| A | 55 | 13.58 | 0.74 | 2.8 | 109 |
| B | 12 | 12.91 | 0.75 | 3.1 | 114 |
| C | 74 | 25.55 | 0.84 | 2.4 | 113 |
| D | 0.1 | 13.65 | 0.47 | 3.3 | 91 |

The papers were imaged with an ink jet printer and the waterfastness of the sheets were evaluated as described above. The waterfastness measured on the ink jet recording sheets prepared from these four basestocks identified in Table II is set forth in the following Table 12:

TABLE 12

| Basestock | Waterfastness |
|---|---|
| A | 2.59 |
| B | 1.61 |
| C | 8.16 |
| D | 1.11 |

In Table 12, waterfastness represents an overall term consisting of the density loss, bleed, and wet-rub parameters described above. Lower numbers indicate better waterfastness.

The basestock properties shown in Table 11 and the waterfastness data shown in Table 12 were entered into a computer program for the purposes of performing a multivariate linear regression analysis. In this analysis, the mathematical correlation between each basestock property (independent variables) and the waterfastness values (dependent variable) are determined. The correlations are displayed as a table of numbers between −1.00 and +1.00. A correlation of +1.00 indicates a perfect direct correlation; that is the dependent variable increases as the independent variable increases. A correlation of −1.00 indicates a perfect inverse correlation; that is the dependent variable decreases as the independent variable increases. A correlation of 0.00 indicates that there exists no correlation between the dependent variable and the independent variable. Values in between suggest various levels of correlation.

The results of the mathematical correlations values between waterfastness (dependent variable) as shown in Table 12 and the basestock properties (independent variables) as shown in Table 8 are set forth in the following Table 13:

TABLE 13

| Photosize | Gurley porosity | Density | Pore Diameter | Contact Angle |
|---|---|---|---|---|
| +0.85 | +0.98 | +0.69 | −0.94 | +0.48 |

The correlations show that there is a very strong direct correlation between waterfastness and Gurley Porosity (by TAPPI method T-460-om-88); that is decreasing Gurley Porosity (making the sheet more open or porous) improves waterfastness. The correlations show that there is a very strong inverse correlation between waterfastness and Pore diameter (based upon mercury intrusion porosimetry); that is increasing Pore diameter (making the sheet more open or porous) improves waterfastness. The correlations show that there is a strong direct correlation between waterfastness and HST (by TAPPI method T-530-pm-89); that is decreasing HST making less hydrophobic or less sized) improves waterfastness. The correlations show that are only moderate to weak correlations between waterfastness and Density and Contact Angle; that is, these are either secondary effects or are not strongly related to waterfastness. The pilot trial described above and the resultant correlation data shows that a basestock that is lightly sized and porous, when coated with the preferred polymer formulation, renders the resultant ink jet recording sheet more waterfast than when a highly sized and non-porous basestock is used.

What is claimed is:

1. An ink jet recording sheet for use in ink jet printing comprising a substrate having one or more nitrogen containing organic species applied to said substrate at the size press in the substantial absence of a pigment, said substrate having a Gurley porosity of from about 5 sec/100 ml to about 25.55 sec/100 ml, a pore diameter of from about 2 to about 3.5, and a photosize (HST) of from about 0.1 to about 74.

2. The recording sheet of claim 1 wherein said substrate is paper.

3. The recording sheet of claim 2 wherein said paper substrate has a Gurley porosity of from about 5 sec/100 ml to about 13.65 sec/100 ml.

4. The recording sheet of claim 3 wherein said Gurley porosity is from about 5 sec/100 ml to about 13.58 sec/100 ml.

5. The recording sheet of claim 4 wherein said Gurley porosity is from about 12.91 sec/100 ml to about 12.91 sec/100 ml.

6. The recording sheet of claim 5 and wherein said species is selected from the group consisting of polyalkylamine dicyandiamide copolymers, polyamines and poly [oxyethylene(dimethyliminio)ethylene(dimethyliominio) ethylene]dichlorides.

7. The recording sheet of claim 6 wherein said species is selected from the group consisting of polyalkylamine dicyandiamide copolymers.

8. The recording sheet of claim 2 wherein said paper substrate has a HST of from about 0.1 second to about 55 seconds.

9. The recording sheet of claim 2 wherein said substrate has a basis weight of from about 20 to about 300 $g/m^2$.

10. The recording sheet of claim 2 wherein the basis weight is from about 20 to about 300 $g/m^2$.

11. The recording sheet of claim 2 wherein the basis weight is from about 50 to about 200 $g/m^2$.

12. The recording sheet of claim 2 wherein the basis weight is from about 60 to about 120 $g/m^2$.

13. The recording sheet of claim 2 wherein said sheet has a density loss ("DL %") is from about −10% to about 10%.

14. The recording sheet of claim 2 wherein said DL % is from about −5% to about 10%.

15. The recording sheet of claim 2 wherein said DL % is from about 0% to about 10%.

16. The recording sheet of claim 2 wherein said sheet has a percent bleed ("% B") equal to or less than about 10%.

17. The recording sheet of claim 2 wherein said % B is equal to or less than about 5%.

18. The recording sheet of claim 2 wherein said % B is equal to or less than about 2%.

19. The recording sheet of claim 2 wherein said % B is about 0%.

20. The recording sheet of claim 2 having a wet-rub ("WR") equal to or less than about 0.1 optical density units (ODU).

21. The recording sheet of claim 2 wherein the WR is equal to or less than about 0.06 ODU.

22. The recording sheet of claim 2 wherein the WR is equal to or less than about 0.04 ODU.

23. The recording sheet of claim 2 wherein the WR is equal to or less than about 0.04 ODU.

24. The recording sheet of claim 1 wherein said pore diameter is from about 2.4 to about 3.3.

25. The recording sheet of claim 24 wherein said pore diameter is from about 2.4 to about 3.1.

26. The recording sheet of claim 25 wherein said pore diameter is from about 2.6 to about 3.0.

27. The recording sheet of claim 1 wherein said HST is from about 1 second to about 74 seconds.

28. The recording sheet of claim 1 wherein the amount of surface in contact with said surface is at least about 1 $g/m^2$.

29. The recording sheet of claim 28 wherein said amount is from about 0.5 to about 3 $g/m^2$.

30. The recording sheet of claim 29 wherein said amount is from about 1 to about 2 $g/m^2$.

31. The recording sheet of claim 1 wherein said nitrogen containing organic specie is selected from the group consisting of cationic polymers and oligomers having a molecular weight equal to or less than 100,000.

32. The recording sheet of claim 31 wherein said molecular weight is equal to or less than about 80,000.

33. The recording sheet of claim 32 wherein said molecular weight is from about 10,000 to about 50,000.

34. The recording sheet of claim 31 wherein said species is selected from the group consisting of polyalkylamine dicyandiamide copolymers, polyamines and poly [oxyethylene(dimethyliminio)ethylene(dimethyliominio) ethylene]dicholorides.

35. The recording sheet of claim 31 wherein said species is selected from the group consisting of polyalkylamine dicyandiamide copolymers and poly[oxyethylene (dimethyliminio)ethylene(dimethyliominio)ethylene] dichlorides.

36. The recording sheet of claim 35 wherein said specifies is selected from the group consisting of polyalkylamine dicyandiamide copolymers.

37. The recording sheet of claim 1 which further comprises one or more starches admixed with said one or more nitrogen containing species.

38. The recording sheet of claim 37 wherein said one or more starches are selected from the group consisting of modified starches.

39. The recording sheet of claim 38 wherein said one or more starches are selected from the group consisting of cationic modified starches, chemically modified starches, non-ionic starches or a combination thereof.

40. The recording sheet of claim 39 wherein said one or more starches are selected from the group consisting of cationic modified starches, chemically modified starches or a combination thereof.

41. The recording sheet of claim 38 wherein said one or more starches are selected from the group consisting of cationic modified starches.

42. The recording sheet of claim 38 wherein said one or more starches are selected from the group consisting of chemically modified starches.

43. The recording sheet of claim 38 wherein said one or more starches are selected from the group consisting of ethylated starches, AP Pearl starches or a combination thereof.

44. The recording sheet of claim 37 wherein the weight ratio of species to starches is equal to or greater than about 10% to 200%.

45. The recording sheet of claim 37 wherein said weight ratio is from about 10% to 100%.

46. The recording sheet of claim 37 wherein said weight ratio is from about 20% to about 80%.

47. The recording sheet of claim 37 wherein said weight ratio is from about 30% to about 50%.

48. The recording sheet of claim 1 that exhibits better waterfastness than does a paper based ink jet recording sheet that is the same except that it does not contain the nitrogen containing species applied at the size press in the substantial absence of a pigment, when the waterfastness is evaluated by at least one method selected from the group consisting of density loss, wet rub and bleed.

49. An uncoated ink jet recording sheet for use in ink jet printing comprising a substrate having one or more nitrogen containing organic species applied to said substrate at the size press in the substantial absence of a pigment, said substrate having Gurley porosity is from about 5 sec/100 ml to about 25.55 sec/10 ml, a pore diameter is from about 2.2 to about 3.3, an HST from about 0.1 seconds to 74 seconds, and a basis weight is from about 60 to about 120 $g/m^2$.

50. The recording sheet of claim 49 that exhibits better waterfastness than does a paper based ink jet recording sheet that is the same except that it does not contain the nitrogen containing species applied at the size press in the substantial absence of a pigment, when the waterfastness is evaluated by at least one method selected from the group consisting of density loss, wet rub and bleed.

51. An uncoated paper ink jet recording sheet prepared by the process comprising:

a. providing an aqueous pulp suspension;

b. sheeting and drying the aqueous pulp suspension to obtain a dried paper;

c. applying to at least one surface of the dried paper at the size press an aqueous composition comprising one or more nitrogen containing organic species and one or more starches in the substantial absence of a pigment; and d. drying the paper to form the paper ink jet recording sheet.

52. The recording sheet of claim 51 that exhibits better waterfastness than does a paper based ink jet recording sheet that is the same except that it does not contain the nitrogen containing species applied at the size press in the substantial absence of a pigment, when the waterfastness is evaluated by at least one method selected from the group consisting of density loss, wet rub and bleed.

* * * * *